US010823217B2

(12) United States Patent
Costabel

(10) Patent No.: US 10,823,217 B2
(45) Date of Patent: Nov. 3, 2020

(54) ATTACHMENT ARRANGEMENT, CLIP BODY AND CLIP

(71) Applicant: SFS intec Holding AG, Heerbrugg (CH)

(72) Inventor: Sascha Costabel, Herrenberg (DE)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 15/746,622

(22) PCT Filed: Jul. 8, 2016

(86) PCT No.: PCT/EP2016/066244
§ 371 (c)(1),
(2) Date: Jan. 22, 2018

(87) PCT Pub. No.: WO2017/016844
PCT Pub. Date: Feb. 2, 2017

(65) Prior Publication Data
US 2018/0216650 A1 Aug. 2, 2018

(30) Foreign Application Priority Data
Jul. 24, 2015 (DE) .................. 10 2015 009 644

(51) Int. Cl.
*F16B 21/07* (2006.01)
*B60R 13/00* (2006.01)
(Continued)

(52) U.S. Cl.
CPC ............ *F16B 21/073* (2013.01); *B60R 13/00* (2013.01); *F16B 2/243* (2013.01); *F16B 2/246* (2013.01);
(Continued)

(58) Field of Classification Search
CPC ....... B60R 13/00; B64C 1/066; F16B 21/073; F16B 2/243; F16B 2/246; F16B 37/043; F16B 37/044; F16B 5/0635; F16B 5/0642
See application file for complete search history.

(56) References Cited

U.S. PATENT DOCUMENTS 2,115,312 A    4/1938  Lombard
2,168,721 A *  8/1939  Tinnerman ............ F16B 37/041
                                                        24/290
(Continued)

FOREIGN PATENT DOCUMENTS

DE          8809756      10/1988
DE        202006014151    3/2008
(Continued)

*Primary Examiner* — Robert Sandy
*Assistant Examiner* — David M Upchurch
(74) *Attorney, Agent, or Firm* — Volpe Koenig

(57) ABSTRACT

A fastening arrangement with a clip body, a fastening device and a panel is provided, with the clip body having a retainer for the fastening device, the clip body being fastenable to the panel which has fastening and positioning openings so that the clip body can be positioned on the panel by a stop of a positioning element on an edge of the positioning opening. The positioning opening has a size which allows the clip body with the fastening device held thereon to be passed at least partially therethrough, the positioning element bearing at least partially against the edge of the positioning opening and the positioning element at the same time being or being connected to a locking element which makes contact with the panel on a side facing away from the retainer. The locking element is arranged opposite the retainer. A clip body and clip are also provided.

15 Claims, 7 Drawing Sheets

(51) Int. Cl.
*F16B 2/24* (2006.01)
*F16B 37/04* (2006.01)
*F16B 5/06* (2006.01)
*B64C 1/06* (2006.01)

(52) U.S. Cl.
CPC .......... *F16B 5/0635* (2013.01); *F16B 5/0642* (2013.01); *F16B 37/043* (2013.01); *F16B 37/044* (2013.01); *B64C 1/066* (2013.01)

(56) References Cited

U.S. PATENT DOCUMENTS

| | | | |
|---|---|---|---|
| 2,196,312 A | 4/1940 | Kost | |
| 2,222,449 A | 11/1940 | Tinnerman | |
| 2,258,845 A | 10/1941 | Burke | |
| 2,346,712 A | 4/1944 | Tinnerman | |
| 2,657,443 A | 11/1953 | Hartman | |
| 4,109,693 A * | 8/1978 | Paskert | F16B 33/002 411/166 |
| 4,125,140 A * | 11/1978 | Basile | B64C 1/14 411/106 |
| 4,270,591 A * | 6/1981 | Gill | F16B 37/041 403/299 |
| 4,333,211 A * | 6/1982 | Gunther | F16B 37/041 411/175 |
| 4,674,931 A * | 6/1987 | Schwind | F16B 37/041 411/175 |
| 4,684,305 A * | 8/1987 | Dubost | B42F 9/00 411/174 |
| 4,798,507 A * | 1/1989 | Olah | F16B 37/041 411/175 |
| 4,883,397 A * | 11/1989 | Dubost | F16B 2/245 411/174 |
| 4,955,772 A | 9/1990 | Reck | |
| 6,474,917 B2 | 11/2002 | Gauron | |
| 6,854,941 B2 * | 2/2005 | Csik | F16B 37/044 411/111 |
| 6,918,725 B2 | 7/2005 | Gauron | |
| 7,527,464 B2 * | 5/2009 | Stewart | F16B 21/09 411/107 |
| 7,654,783 B2 * | 2/2010 | Giraud | F16B 37/041 411/174 |
| 8,177,466 B2 * | 5/2012 | Csik | F16B 37/043 411/174 |
| 8,522,408 B2 * | 9/2013 | Lill | E03F 1/00 24/514 |
| 8,579,569 B2 | 11/2013 | Schendel | |
| 8,696,279 B2 * | 4/2014 | Sbongk | F16B 5/02 411/174 |
| 8,911,191 B2 * | 12/2014 | James | F16L 3/123 248/220.41 |
| 9,083,169 B2 | 7/2015 | James et al. | |
| 9,347,480 B2 * | 5/2016 | Kuhm | F16B 37/043 |
| 9,816,547 B2 | 11/2017 | Costabel et al. | |
| 2004/0202523 A1 | 10/2004 | Csik | |

FOREIGN PATENT DOCUMENTS

| | | |
|---|---|---|
| DE | 102007059148 | 7/2009 |
| DE | 102013018113 | 3/2015 |
| DE | 102014000231 | 7/2015 |

* cited by examiner

ATTACHMENT ARRANGEMENT, CLIP BODY AND CLIP

BACKGROUND

The invention relates to a fastening arrangement with a clip body, a fastening device and a panel, the clip body having a retainer for the fastening device, the clip body being fastenable to the panel provided with at least one fastening opening, the panel having a positioning opening in addition to the fastening opening so that the clip body can be positioned on the panel by means of a stop of at least one positioning element on an edge of the positioning opening, the positioning opening having a size which allows the clip body with the fastening device held thereon to be passed at least partially through, the positioning element bearing at least partially against the edge of the positioning opening and the positioning element at the same time being or being connected to a locking element which makes contact with the panel on a side facing away from the retainer. The invention also relates to a clip body and a clip.

A fastening arrangement of this type is known from U.S. Pat. No. 2,222,449. In said document, a tongue is passed through a positioning opening which provides a certain radial fixing of the clip body relative to the panel. The tongue also provides axial locking.

A further fastening arrangement is known from U.S. Pat. No. 9,083,169 B2. Said fastening arrangement comprises a device for holding a nut, the device and the nut together being aligned with a fastening opening in a panel. To position the device and to provide an axial retaining force, positioning openings, into which hook-like projections of the device engage, are provided in the panel.

Further example of clips which are used for fastening to and of panels are described in DE 20 2006 014 151 U1, U.S. Pat. No. 6,918,725 B2, and U.S. Pat. No. 6,474,917 B2.

Common to all the clips of the latter published documents is that they have two limbs, of which one is arranged on one side of the panel and the other is arranged on the other side of the panel. To this end, the clip is fitted onto an edge of the panel. Axial forces, i.e. forces acting perpendicularly or virtually perpendicularly to the panel, must be absorbed by the spring force of the two limbs connected to each other. Depending on the design of the clip, positioning of the clip must be checked visually by the fitter via the fastening opening. The limb on one side of the panel can bend away when a fastening device is introduced, so that the clip loses its position and connection to the second panel is no longer possible.

SUMMARY

An object of the invention is to provide a fastening arrangement, a clip body and a clip to operate in the region of fastening openings which are not necessarily arranged close to the edge of a panel and which allow reliable and practical positioning of the clip on the panel, while the fastening arrangement is provided with sufficient stability.

This object is achieved with one or more features of the invention. Advantageous embodiments of the invention are described below and in the claims.

The invention builds on the fastening arrangement of the type in question in that the locking element is arranged opposite the retainer. This results in a practical solution for producing a fastening arrangement. The clip body can be passed through the positioning opening in the panel without particular visual checking. As soon as the clip body has reached its end position, the positioning element of the clip body is supported on the edge of the positioning opening so that the clip body no longer changes position in an undesirable manner.

The invention consists in a fastening arrangement with a clip body, a fastening device and a panel, the clip body having a retainer for the fastening device, the clip body being fastenable to the panel provided with at least one fastening opening, the panel having a positioning opening in addition to the fastening opening so that the clip body can be positioned on the panel by means of a stop of at least one positioning element on an edge of the positioning opening, the positioning opening having a size which allows the clip body with the fastening device held thereon to be passed at least partially through, the positioning element bearing at least partially against the edge of the positioning opening and the positioning element at the same time being or being connected to a locking element which makes contact with the panel on a side facing away from the retainer. In particular, the locking element is arranged opposite the retainer.

This stabilizes the clip body in the axial direction. Whereas clip bodies in the prior art are axially stabilized in the region of the fastening arrangement only when the fastening device is completed, this is different for the present clip body. In the present case, axial stabilization is already provided from the moment at which the clip body is inserted into the panel. This makes work on the object easier, and additional stability is also provided for the finished fastening arrangement, thanks to the locking element. As soon as the clip body is inserted into the panel and has reached its end position, the positioning opening is completely covered by the clip body. This makes it easier to work on the object, in particular to attach fire-retardant adhesive tape to the panel on a side facing away from the retainer.

It is particularly preferred for the panel to be arranged in the interior of a vehicle or aircraft.

The invention also relates to a clip body for a fastening arrangement as described above.

Usefully, the locking element has at least one tongue.

It is also possible for the clip body to have at least one reinforcement element. Reinforcement elements, for example ribs, help to give the clip body additional stability, so that it maintains its position on the panel, in particular when the fastening device is completed.

Usefully, the clip body is produced from an insulating material and/or from a material which prevents contact corrosion. Since the clip bodies are used to produce a fastening arrangement in different environments, the prevention of corrosion should be ensured under all circumstances. Precisely the regions in which fastening arrangements are provided are subjected to particular mechanical stresses, and therefore weakening as a result of corrosion in these regions is not acceptable, in particular if they are safety-critical regions as are often found in automotive and aerospace engineering.

In this connection, it can be practical for the clip body to consist of plastic.

Furthermore, it is also useful in this connection for at least one sealing element to be attached to the clip body. Sealing elements can also ensure that different sides of the interconnected panels can be separated from each other in a gas-tight and/or liquid-tight manner.

The invention also relates to a clip having a clip body as described above and having a fastening device.

It is usefully provided for the fastening device to be at least partially bolt-like.

Particular embodiments of the clip are developed such that
   the fastening device comprises a retaining cam and a pin,
   the fastening device comprises a nut and a screw-fastening,
   the fastening device comprises a spring clip and a pin,
   the fastening device comprises a taper nut and a screw-fastening.

According to a particularly preferred embodiment of the clip according to the invention, the fastening device is held in the retainer with play in at least one direction parallel to the panel. The play of the fastening device in the retainer means that the overall fastening arrangement is given enough tolerance for the clip to be used even for tasks in which a certain tolerance is required from the start.

BRIEF DESCRIPTION OF THE DRAWINGS

The invention is now explained by way of example using particularly preferred embodiments, with reference to the attached drawings.

DETAILED DESCRIPTION OF THE PREFERRED EMBODIMENTS

In the following description of detailed embodiments of the invention, the same reference signs refer to the same or comparable components.

Figure 1:
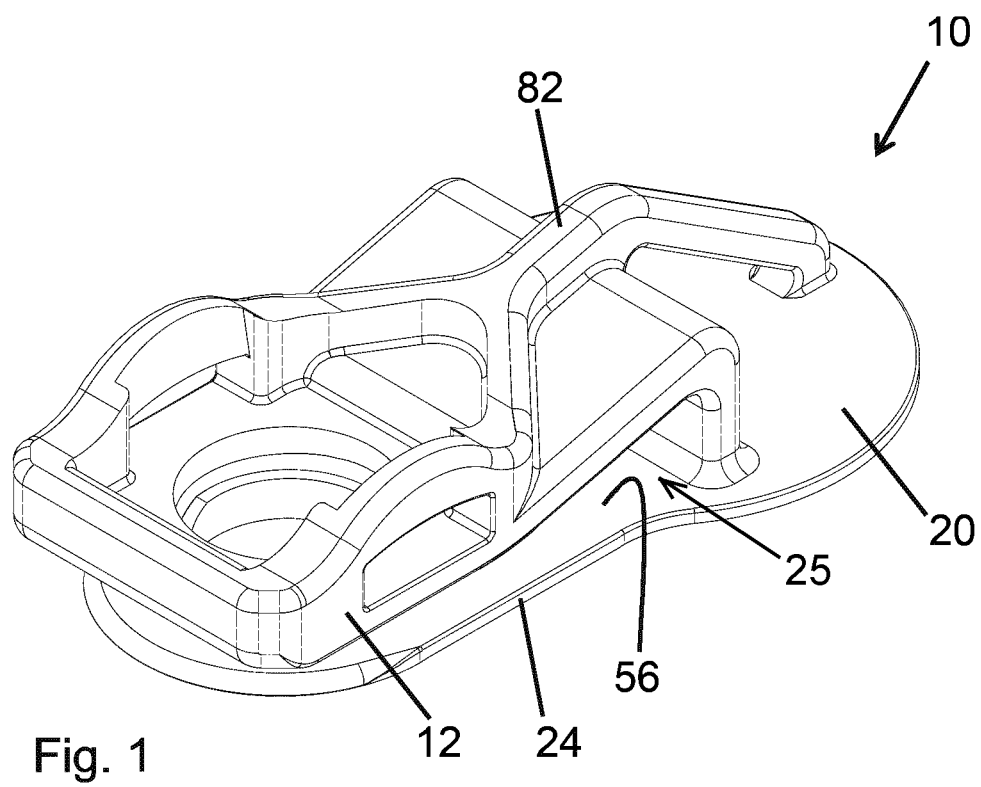
FIG. 1 shows a first perspective diagram of a first embodiment of a clip body.
Figure 2:
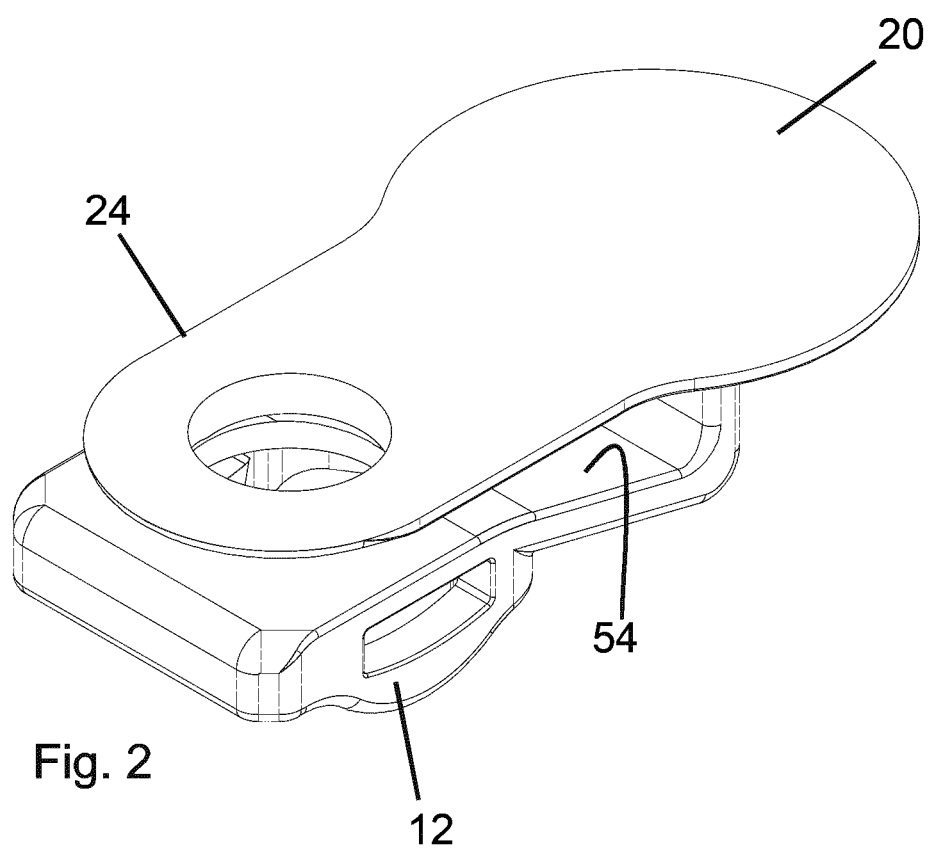
FIG. 2 shows a second perspective diagram of the first embodiment of a clip body.
Figure 3:
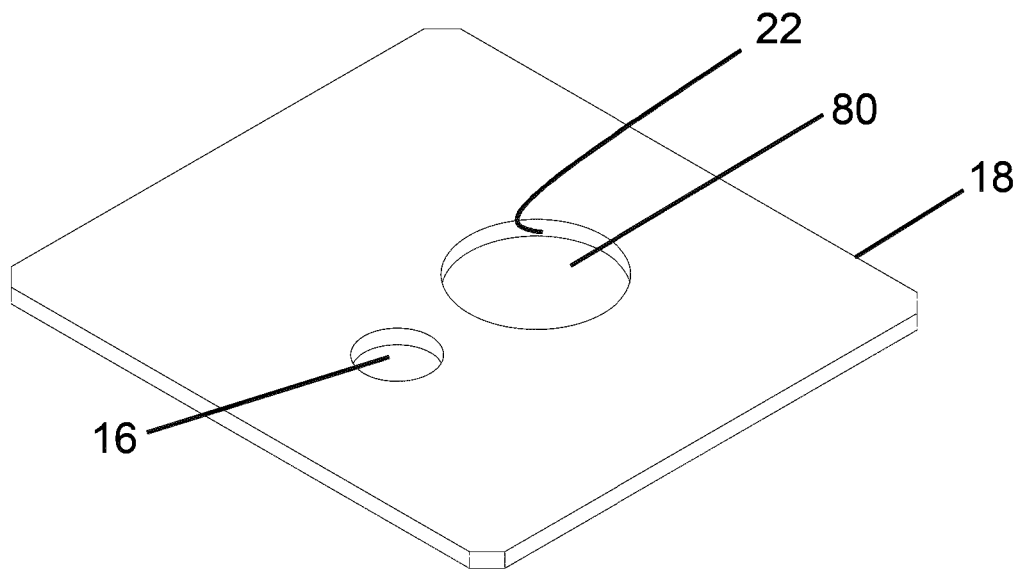
FIG. 3 shows a panel having a fastening opening and a positioning opening.
Figure 4:
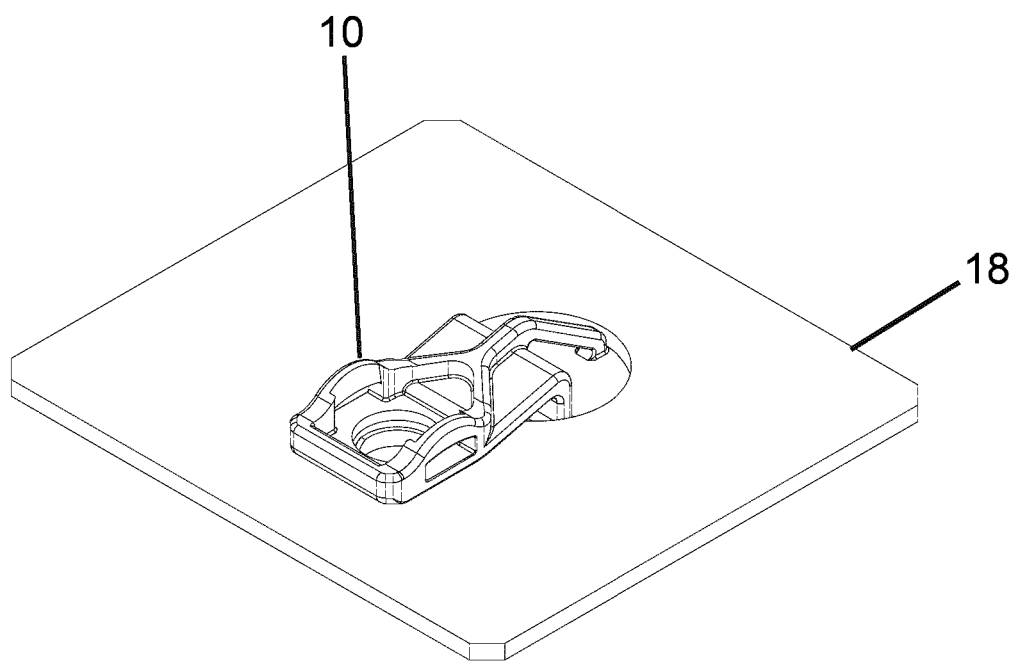
FIG. 4 shows the panel according to FIG. 3 with the clip body arranged therein.

FIG. 1 shows a first perspective diagram of a first embodiment of a clip body 10. FIG. 2 shows a second perspective diagram of the first embodiment of a clip body 10. FIG. 3 shows a panel 18 having a fastening opening 16 and a positioning opening 80. FIG. 4 shows the panel 18 according to FIG. 3 with the clip body 10 arranged therein. The clip body 10 has a retainer 12 for a fastening device (not shown here). Fastening devices of different kinds are shown in FIGS. 5 to 12 and generally provided with the reference sign 14. The clip body 10 also comprises a positioning element 20. The positioning element shown here is in particular suitable for a circular positioning opening 80 in a panel 18. The clip body, where appropriate with the fastening device fastened thereto, is partially passed through the positioning opening 80 in the panel 18. In the process, a tongue 24, which acts as a locking element, of the clip body 10 comes to bear against one side of the panel 18. The region of the clip body 10 which bears the retainer 12 bears against the other side of the panel 18. The tongue 24 together with the retainer 12 forms a U-shaped panel receiving area 25. Reinforcement elements 82 are provided to reinforce the clip body 10. While the elastic force applied by the tongue 24 and by the mating components bearing the retainer 12 effects locking of the clip body in the axial direction, the positioning element 20 is used to prevent shifting of the clip body 10 parallel to the panel 18. To this end, the positioning element 20 bears partially against the edge 22 of the positioning opening 80. In the present exemplary embodiment, the clip body 10 has two contact regions 54, 56 for the panel 18. The first contact region 54 makes contact with the panel on the side facing the retainer. This contact region 54 is a lower face of the clip body 10, if the clip body is fastened with the retainer on the upper face of the panel 18. A further contact region 56 is defined by the upper face of the tongue 24. It can be seen that the positioning opening 80 is larger than the fastening opening 16. This makes it possible for the clip body to be pushed easily and conveniently through the positioning opening 80, even with the fastening device fastened to the clip body, that is, as a complete clip, when the positioning opening 80 has the corresponding size.

Figure 5:
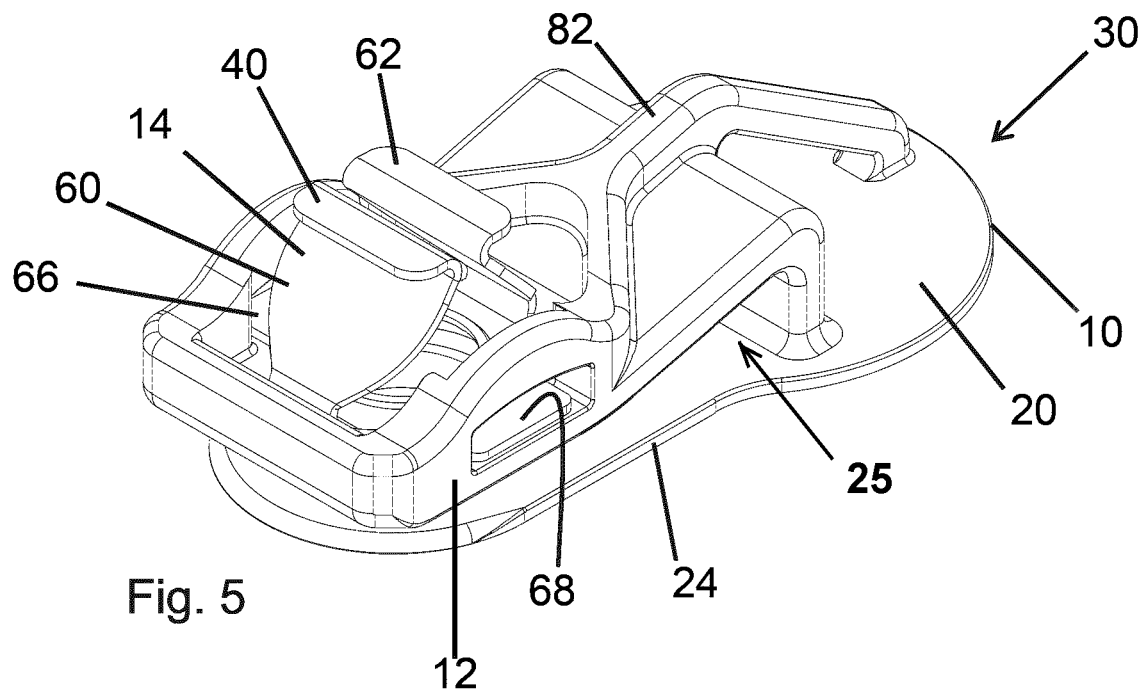
FIG. 5 shows a perspective diagram of a first embodiment of a clip.
Figure 6:
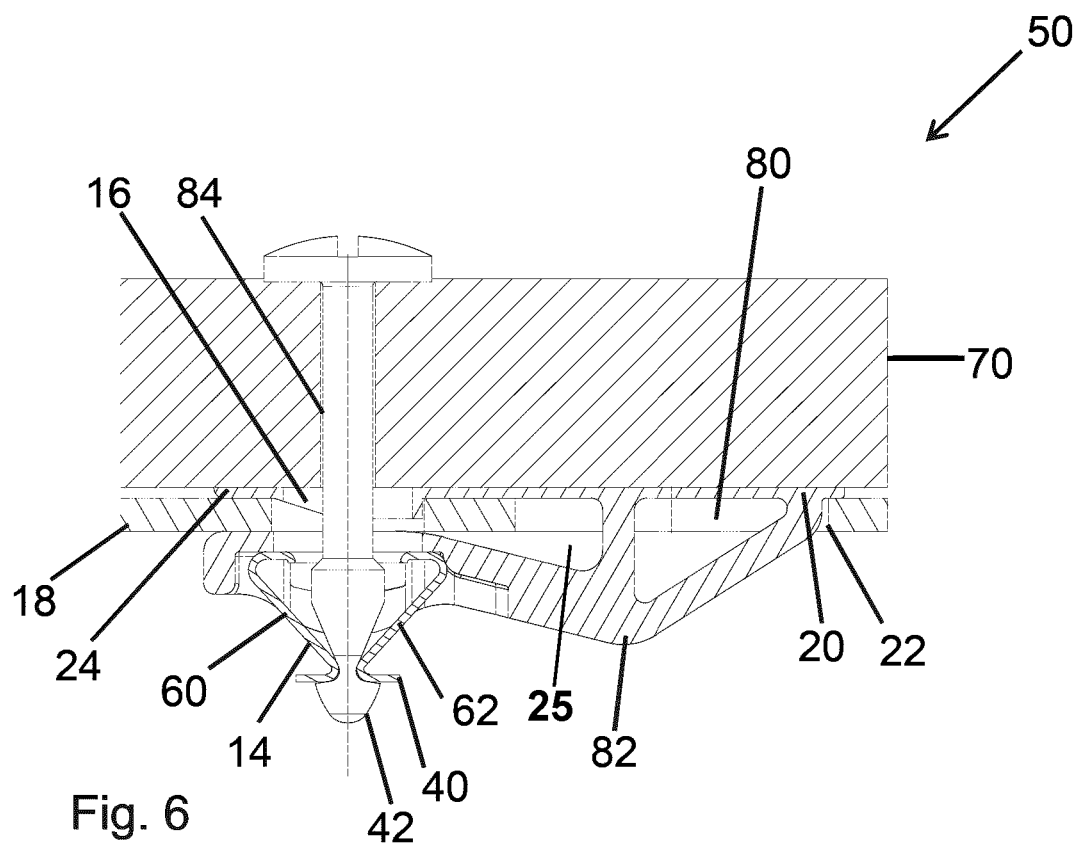
FIG. 6 shows a section through a fastening arrangement having a clip according to FIG. 5.

FIG. 5 shows a perspective diagram of a first embodiment of a clip. FIG. 6 shows a section through a fastening arrangement having a clip according to FIG. 5. Using the example of the clip body 10 according to FIGS. 1 and 2, the completion of the clip body to form the clip 30 and the interaction of the clip with a complete fastening arrangement 50 is explained. The clip body 10 is provided with a fastening device 14, which is in the form of a spring clip 40 in the present case. The spring clip 40 comprises two resilient limbs 60, 62, which are connected via a perforated connecting region. On the connecting region are arranged tongues 66, 68, with which the spring clip 40 engages in the retainer 12 of the clip body 10 and is retained on the clip body 10 thereby. Depending on the dimensions of the retainer 12 and of the fastening device 14, in particular of the tongues 66, 68 on the fastening device 14, the fastening device 14 is tilted into the retainer, a tongue 66, 68 being introduced into an opening in the retainer 12 first. Then the fastening device 14 is moved such that the connecting region is parallel to the clip body 10. The fastening device 14 reaches its end position by being pushed into a symmetrical position on the clip body 10. In an alternative embodiment, the fastening device 14 can be arranged in the retainer 12 of the clip body 10 by first being introduced into the clip body 10 at a 90° angle to its final position. When the clip body is rotated 90° into the final position, the tongues 66, 68 pass into the openings in the retainer 12 to provide the required retention. Both tongues 66, 68 then lie in the retainer 12. The positioning element 20 then lies on the edge 22 of the fastening opening 16. Although an end position is defined by a symmetrical arrangement of the fastening device 14 in the clip body 10, there is preferably also a certain amount of play, so that the fastening device 14 can be moved to and fro inside the clip body 10. This play should exist at least in one direction parallel to the panel, preferably in all directions parallel to the panel. When the clip is in the mounted state, it engages under the panel 18 by means of the tongue 24, with the panel 18 being received in the U-shaped panel receiving area 25 between the tongue 24 and the retainer 12. The arrangement thus produced of panel 18 and clip 30 is placed onto a second panel 70, so that the tongue 24 lies between the panels 18, 70. The positioning element 20 likewise lies partially between the panels 18, 70, specifically adjacent to the positioning opening 80. A pin 42 is then guided through the openings 16, 84 in the panels 18, 70. A thickened end of said pin forces the limbs 60, 62 of the spring clip apart. The pin 42 has reached its end position when the limbs 60, 62 spring back together and pass into a tapered region below the thickened end of the pin 42. The pin 42 is preferably not rotationally symmetrical in the tapered region below the thickened end but rather has a thickness, in a direction perpendicular to the plane of view in FIG. 6, which corresponds to its thickened end. This makes it possible to remove the pin 42 again from the fastening arrangement. Specifically, when the pin 42 is rotated, it forces the limbs 60, 62 of the spring clip 40 apart again, so that the thickened end of the pin 42 no longer finds purchase in the spring clip 40 and can be pulled out.

Figure 7:
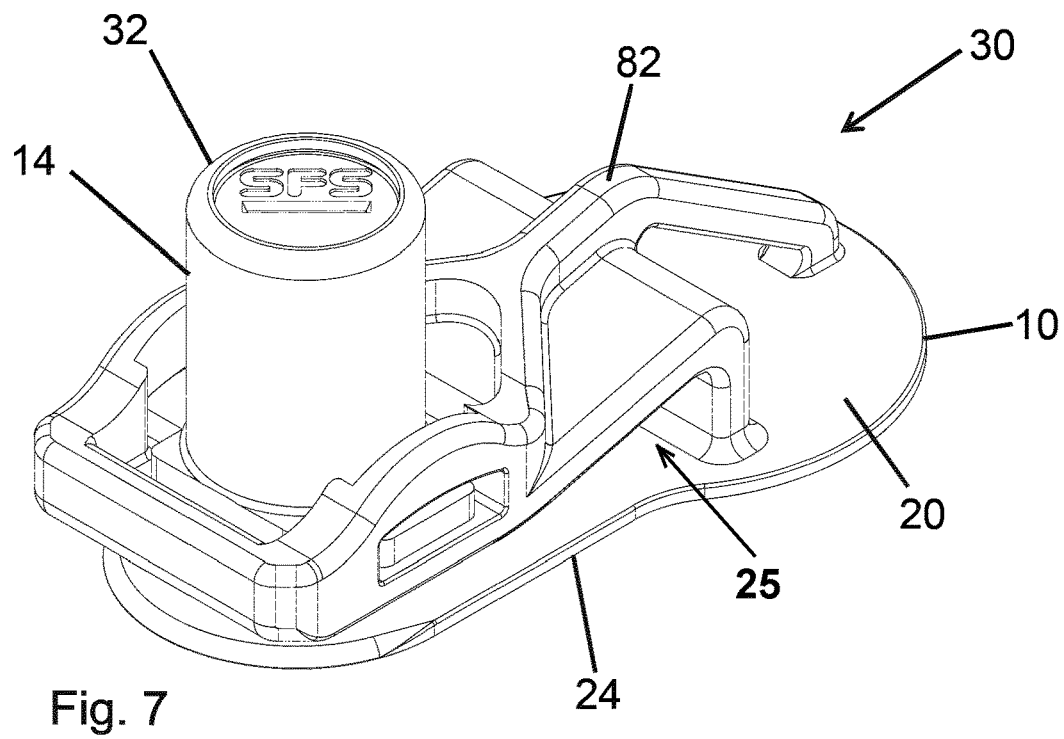
FIG. 7 shows a perspective diagram of a second embodiment of a clip.
Figure 8:
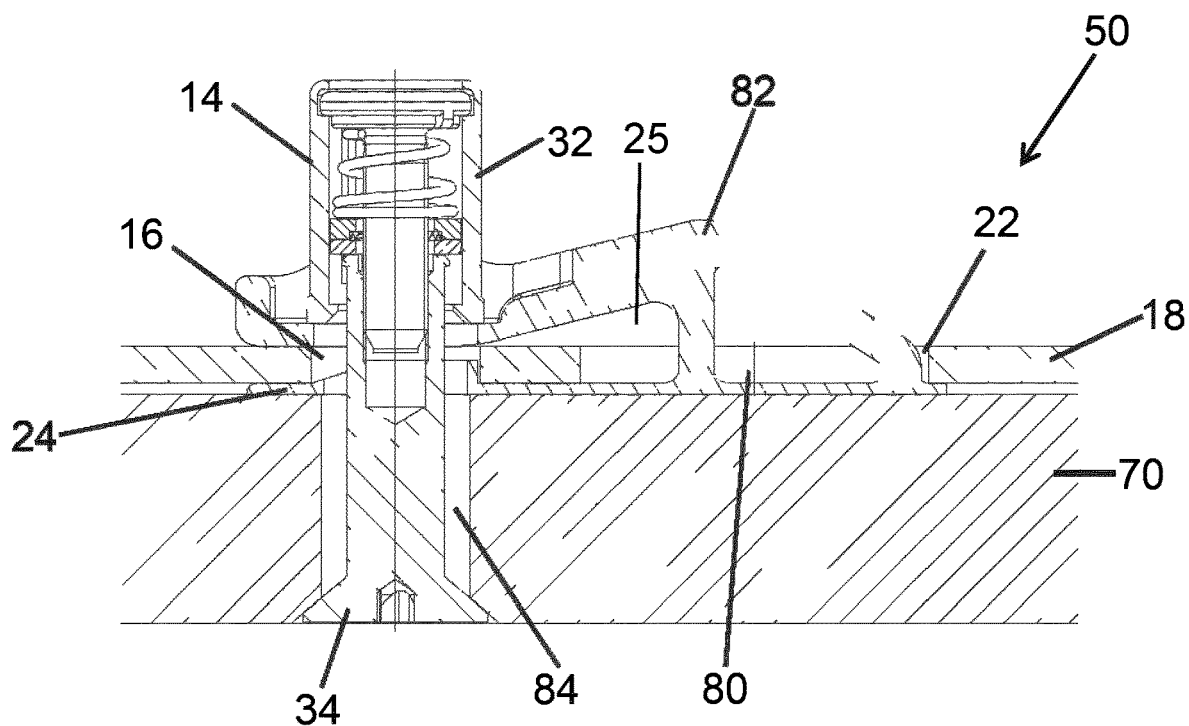
FIG. 8 shows a section through a fastening arrangement having a clip according to FIG. 7.

FIG. 7 shows a perspective diagram of a second embodiment of a clip. FIG. 8 shows a section through a fastening arrangement having a clip according to FIG. 7. On the clip body 10, which is identical to that described in connection with FIGS. 5 and 6, is arranged a fastening device 14 of a different type. In this case, it is a retaining cam 32 which can interact with a pin 34. The manner in which this arrangement of retaining cam 32 and pin 34 functions is described in detail in DE 10 2007 959 148 B4, the disclosure of which in this regard is fully included in the content of the present disclosure.

Figure 9:
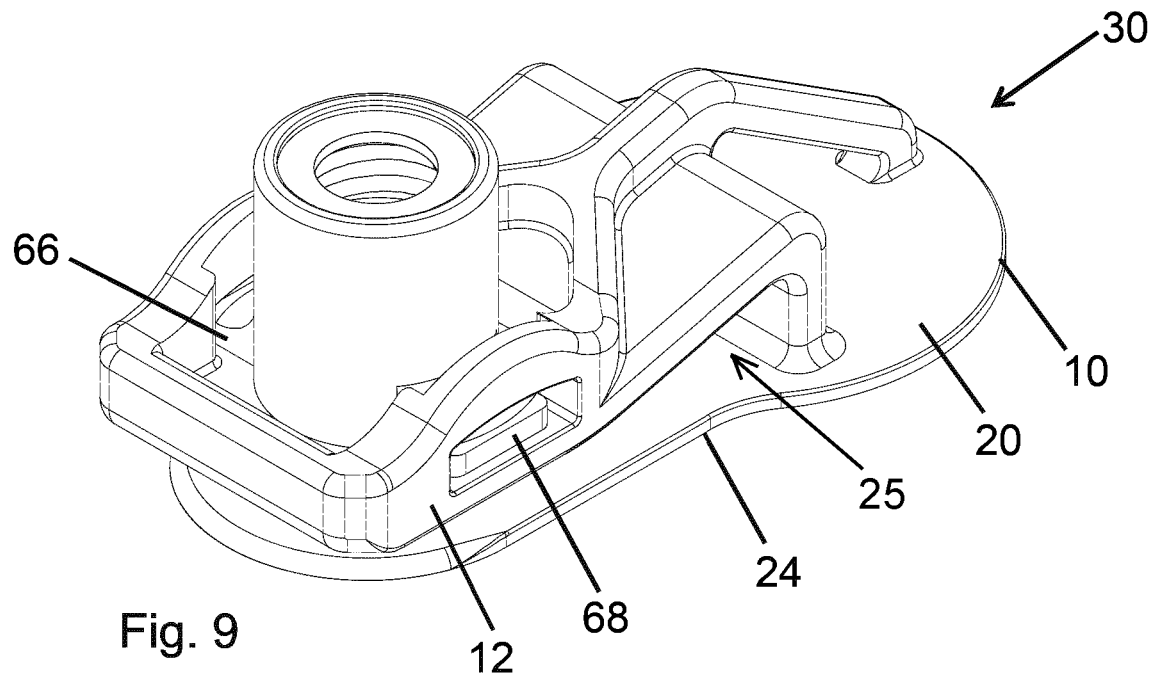
FIG. 9 shows a perspective diagram of a third embodiment of a clip.
Figure 10:
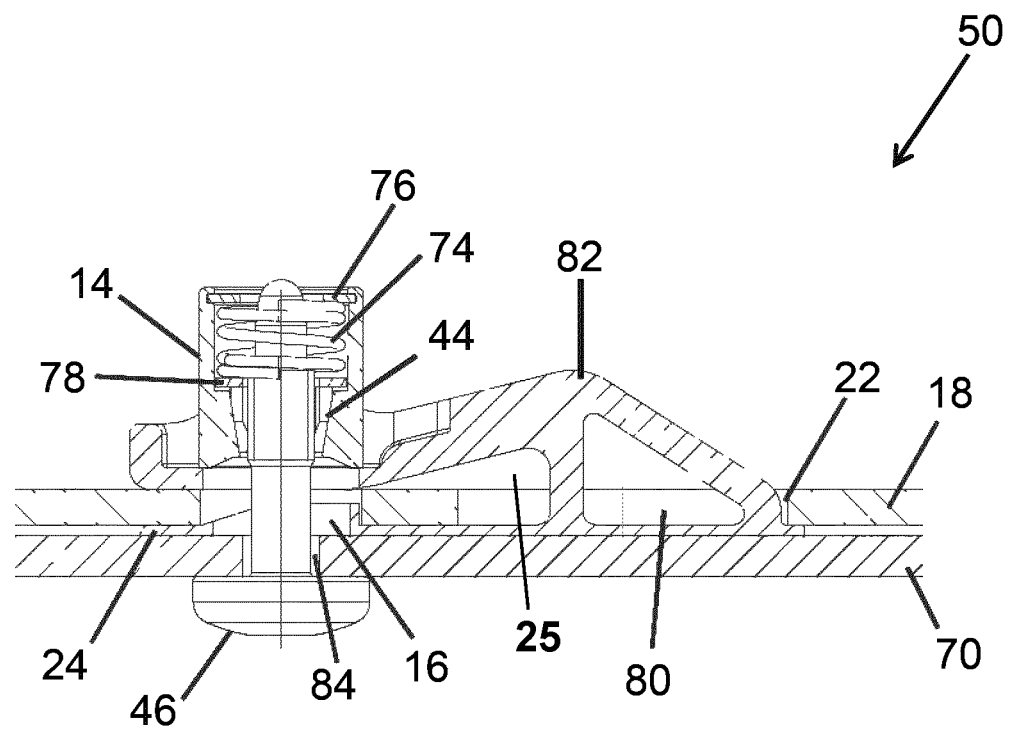
FIG. 10 shows a section through a fastening arrangement having a clip according to FIG. 9.

FIG. 9 shows a perspective diagram of a third embodiment of a clip. FIG. 10 shows a section through a fastening arrangement having a clip according to FIG. 9. Again using the example of the same clip body 10 as in FIGS. 5, 6, 7 and 8, a further variant of a clip 30 is shown. This clip 30 has a taper nut 44 as the fastening device 14, which interacts with a screw-fastening 46. The taper nut 44 sits in a housing and is driven by a spring 74, which is tensioned between two panels 76, 78, into an end position in a conical seat in the housing. If, starting from this end position, a screw-fastening 46 is pushed into the taper nut 44 (the screw-fastening 46 does not have to be rotated), the taper nut 44 is displaced under the compression of the spring 74. The taper nut 44 is made such that the diameter of its internal thread can increase during this process. The screw-fastening 46 can thus penetrate the taper nut 44. Once the screw-fastening 46 has reached its final position, the threads of the screw-fastening and of the taper nut 44 lie in each other, so that the taper nut 44 can again be arranged completely or virtually completely in its seat inside the housing. If one wishes to remove the screw-fastening 46 from the fastening arrangement 50, this can be done by unscrewing.

In another embodiment, it is not necessary to use a nut and a screw-fastening. Rather, an article can be used which is somehow provided with grooves inside, instead of the nut 44. A pin has corresponding grooves. The pin is introduced into the article in an identical manner to that described in connection with the taper nut 44 and the screw-fastening 46. However, it is not possible to move the article out of the fastening arrangement by un-screwing as described in connection with the taper nut 44 and screw-fastening 46.

Figure 11:
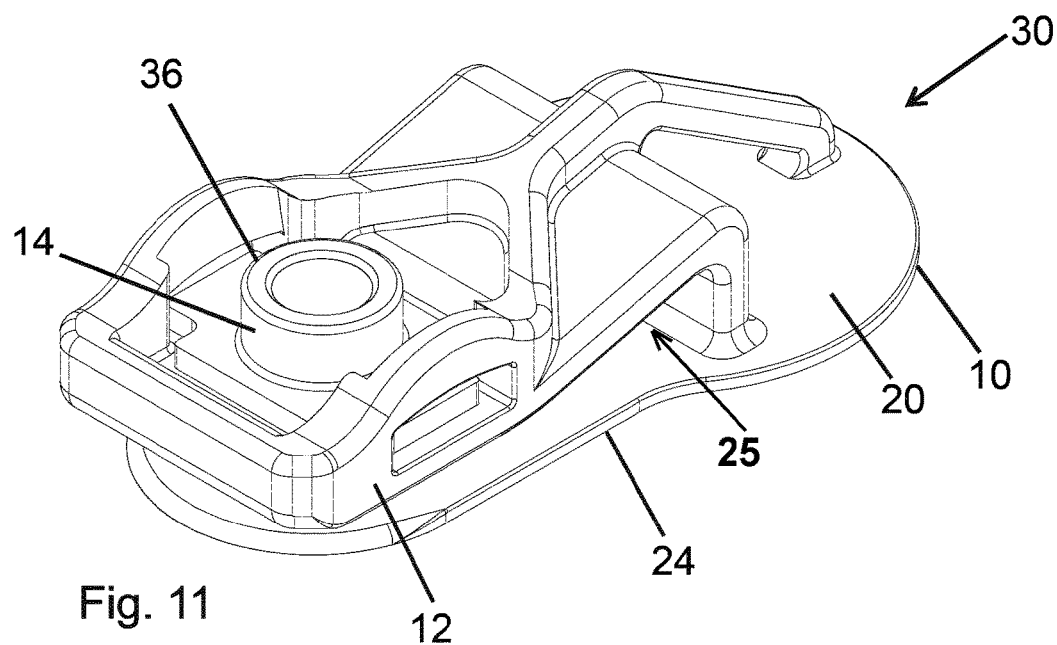
FIG. 11 shows a perspective diagram of a fourth embodiment of a clip.

FIG. 11 shows a perspective diagram of a fourth embodiment of a clip.

Figure 12:
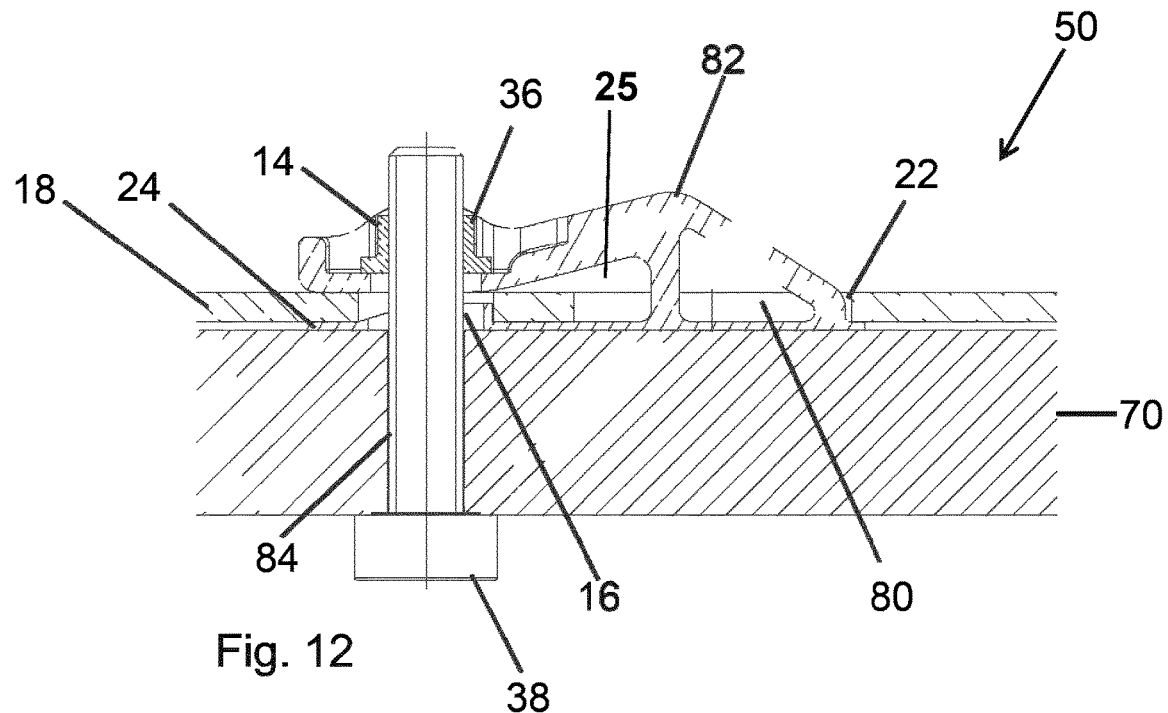
FIG. 12 shows a section through a fastening arrangement having a clip according to FIG. 11.

FIG. 12 shows a section through a fastening arrangement having a clip according to FIG. 11. The clip body 10 is again identical to the clip bodies of the fastening arrangements 50 described in connection with FIGS. 5, 6, 7, 8, 9 and 10. In this case, the fastening device 14 is formed by a nut 36 which interacts with a screw-fastening 38.

Figure 13:
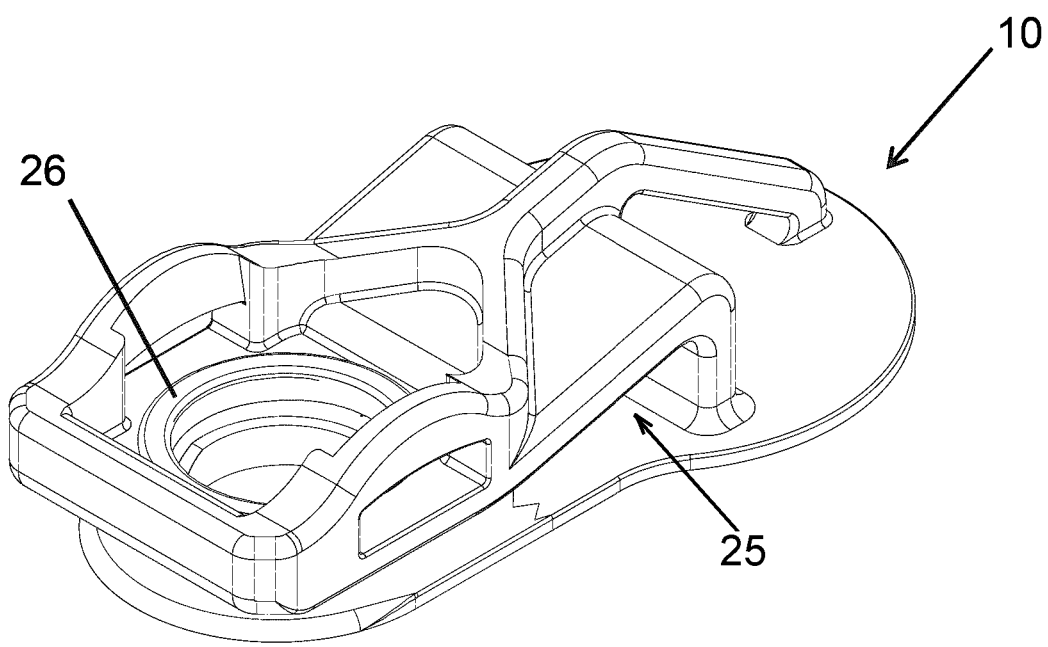
FIG. 13 shows a first perspective diagram of a clip body.

FIG. 13 shows a first perspective diagram of a clip body.

Figure 14:
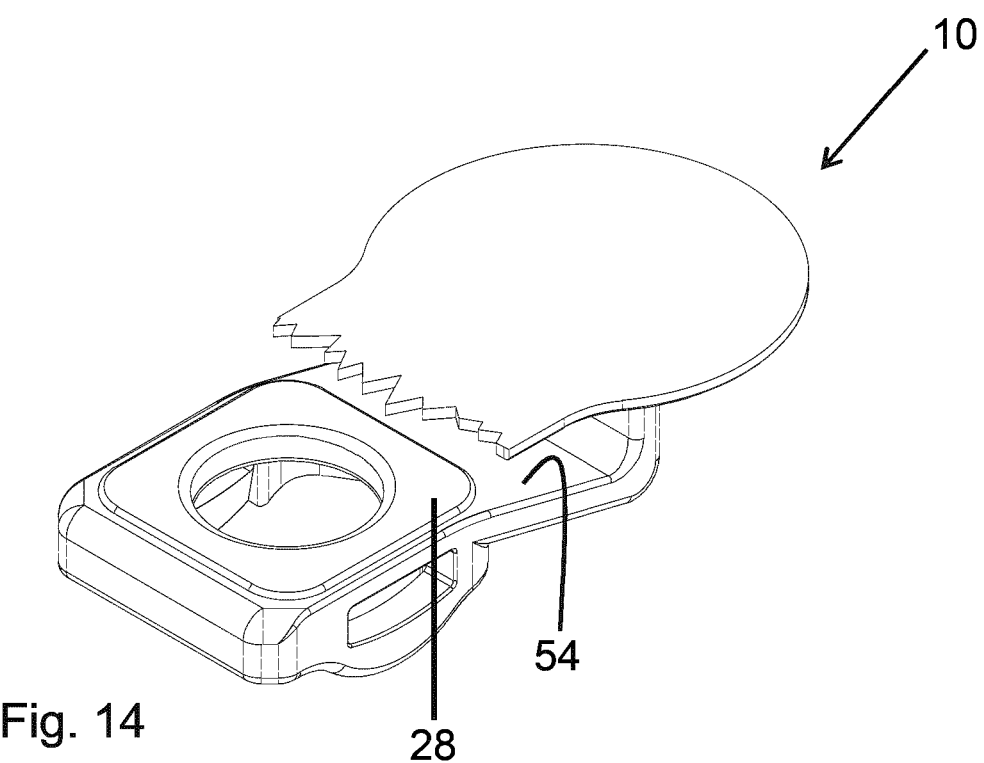
FIG. 14 shows a second perspective diagram of the clip body according to FIG. 13 with the locking element partially cut away.

FIG. 14 shows a second perspective diagram of the clip body according to FIG. 13 with the locking element partially cut away. A seal 28 is arranged on the contact region 54 of the clip body 10. Therefore, said seal lies on the upper face of the panel (not shown here). It prevents contact corrosion, depending on the materials of the components involved. Furthermore, a region above the fastening arrangement can be separated in a gas-tight and/or liquid-tight manner from a region below the fastening arrangement. A further seal 26 is arranged where the fastening device 14 sits on the clip body 10. This can again prevent contact corrosion. This also helps to seal off the different regions.

The features of the invention disclosed in the above description, in the drawings and in the claims can be essential to the realization of the invention both individually and in any desired combination.

LIST OF REFERENCE SYMBOLS

10 Clip body
12 Retainer
14 Fastening device
16 Fastening opening
18 Panel
20 Positioning element
22 Edge
24 Tongue
26 Sealing element
28 Sealing element
30 Clip
32 Retaining cam
34 Pin
36 Nut
38 Screw-fastening
40 Spring clip
42 Pin
44 Taper nut
46 Screw-fastening
50 Fastening arrangement
54 Contact region
56 Contact region
60 Limb
62 Limb
66 Tongue
68 Tongue
70 Panel
74 Spring
76 Panel
78 Panel
80 Positioning opening
82 Reinforcement element
84 Opening

The invention claimed is:

1. A fastening arrangement, comprising a clip body, a fastening device and a panel,
    the clip body having a retainer for the fastening device and a positioning element, and being fastenable to the panel which includes at least one fastening opening,
    the panel having a positioning opening in addition to the fastening opening so that the clip body is positionable on the panel by a stop of the positioning element on an edge of the positioning opening, the positioning opening having a size which allows the retainer with the fastening device held thereon to be passed therethrough, the positioning element bearing at least partially against the edge of the positioning opening, and a portion of the clip body that connects the retainer to the positioning element extending through the positioning opening, the positioning element further comprising or being connected to a locking element which makes contact with the panel on a side facing away from the retainer, the locking element is arranged opposite the retainer and includes at least one tongue that together with the retainer forms a U-shaped panel receiving area, and bears against the side of the panel facing away from the retainer, and the clip body has at least one rib as a reinforcement element reinforcing the clip body.

2. The fastening arrangement according to claim 1, wherein the panel is arranged in an interior of a vehicle or aircraft.

3. A clip body for a fastening arrangement, the clip body comprising:

a retainer for a fastening device and a positioning element including a stop, the clip body is adapted to be positioned on a panel by the stop of the positioning element contacting an edge of a positioning opening in the panel with the retainer for the fastening device being positioned at a fastening opening in the panel, the retainer being sized to pass through with a fastening device held thereon with the positioning element bearing at least partially against the edge of the positioning opening, and a portion of the clip body that connects the retainer to the positioning element being adapted to extend through the positioning opening, the positioning element further comprising or being connected to a locking element which makes contact with the panel on a side facing away from the retainer, the locking element is arranged opposite the retainer and includes at least one tongue that together with the retainer forms a U-shaped panel receiving area, and bears against the side of the panel facing away from the retainer, and the clip body has at least one rib as a reinforcement element reinforcing the clip body.

4. The clip body according to claim 3, wherein the clip body is at least one of produced from an insulating material or from a material which prevents contact corrosion.

5. The clip body according to claim 3, wherein the clip body is formed of plastic.

6. The clip body according to claim 3, further comprising at least one sealing element attached to the clip body.

7. A clip comprising the clip body according to claim 3 and a fastening device.

8. The clip according to claim 7, wherein the fastening device is at least partially bolt-shaped.

9. The clip according to claim 7, wherein the fastening device comprises a holding cam and a pin.

10. The clip according to claim 7, wherein fastening device comprises a nut and a screw-fastening.

11. The clip according to claim 7, wherein the fastening device comprises a spring clip and a pin.

12. The clip according to claim 7, wherein the fastening device comprises a taper nut and a screw-fastening.

13. The clip according to claim 7, wherein the fastening device is held in the retainer with play in at least one direction parallel to a panel.

14. The fastening arrangement according to claim 1, wherein the at least one rib also extends through the positioning opening.

15. The fastening arrangement according to claim 1, wherein the at least one rib reinforces the clip body in a longitudinal direction defined between the fastening opening and the positioning opening.

* * * * *